US010351220B1

(12) United States Patent
Witte et al.

(10) Patent No.: US 10,351,220 B1
(45) Date of Patent: Jul. 16, 2019

(54) TROLLING MOTOR ASSEMBLY WITH REPLACEABLE NOSECONE

(71) Applicant: Brunswick Corporation, Mettawa, IL (US)

(72) Inventors: John Witte, Ada, MI (US); Nathan D. Koetsier, Marne, MI (US); Michael J. Boks, Grand Rapids, MI (US); Katherine D. Winer, Rockford, MI (US); Benjamin D. Curtis, Grand Rapids, MI (US); Haley A. Raatz, Grand Rapids, MI (US); Kevin T. Downey, Rockford, MI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/927,598

(22) Filed: Mar. 21, 2018

(51) Int. Cl.

| | |
|---|---|
| ***B63H 21/17*** | (2006.01) |
| ***B60L 11/00*** | (2006.01) |
| ***B63H 20/00*** | (2006.01) |
| ***G10K 11/00*** | (2006.01) |
| ***B63H 20/34*** | (2006.01) |

(52) U.S. Cl.
CPC ........... *B63H 20/007* (2013.01); *B63H 20/34* (2013.01); *G10K 11/006* (2013.01)

(58) Field of Classification Search
CPC ...... B63H 20/00; B63H 20/007; B63H 20/32; B63H 20/34; B63H 2020/00; B63H 2020/32
USPC ................................................. 440/6, 76, 78
See application file for complete search history.

(56) References Cited

U.S. PATENT DOCUMENTS

| | | | | |
|---|---|---|---|---|
| 2,429,774 | A * | 10/1947 | Schultz | B63H 23/24 310/66 |
| 4,737,940 | A | 4/1988 | Arringotn | |
| 4,832,635 | A | 5/1989 | McCormick | |
| 5,525,081 | A | 6/1996 | Mardesich et al. | |
| 5,536,188 | A | 7/1996 | Porta | |
| 5,697,319 | A | 12/1997 | Steensland et al. | |
| 6,160,764 | A | 12/2000 | Powell | |
| 6,652,331 | B2 | 11/2003 | Healey | |
| 6,661,742 | B2 | 12/2003 | Hansen | |
| 6,870,794 | B2 | 3/2005 | Healey | |
| 7,652,952 | B2 | 1/2010 | Betts et al. | |
| 9,142,206 | B2 | 9/2015 | O'Dell | |
| 9,541,643 | B2 | 1/2017 | Maguire | |
| 9,759,813 | B2 | 9/2017 | Smith et al. | |
| 2002/0013106 | A1 | 1/2002 | Healey | |

(Continued)

OTHER PUBLICATIONS

Motorguide, "R3 Operation Maintenance Installation Warranty Manual," owner's manual, 2014, p. 19.

(Continued)

*Primary Examiner* — Daniel V Venne
(74) *Attorney, Agent, or Firm* — Andrus Intellectual Property Law, LLP

(57) ABSTRACT

A trolling motor assembly includes a main housing holding an electric motor. A propeller is attached to a propeller shaft that is driven by the electric motor and projects from a rear end of the main housing. A steering shaft is configured to couple the main housing to a watercraft. A nosecone is coupled to the main housing at the front end of the main housing. The nosecone is removable from the front end of the main housing. The main housing is watertight when the nosecone is removed therefrom.

20 Claims, 6 Drawing Sheets

(56) References Cited

U.S. PATENT DOCUMENTS

| | | | | |
|---|---|---|---|---|
| 2002/0044500 | A1 | 4/2002 | Hansen | |
| 2015/0158570 | A1* | 6/2015 | Schlintz | B63H 20/32 416/170 R |
| 2016/0207602 | A1* | 7/2016 | Clark | B63H 20/007 |
| 2016/0320474 | A1 | 11/2016 | Proctor et al. | |
| 2016/0325814 | A1* | 11/2016 | Antao | B63H 20/007 |
| 2017/0089563 | A1 | 3/2017 | Schroeder | |

OTHER PUBLICATIONS

Motorguide, "X5 Operation Maintenance Installation Warranty Manual," owner's manual, 2017, pp. 31-33.

* cited by examiner

TROLLING MOTOR ASSEMBLY WITH REPLACEABLE NOSECONE

FIELD

The present disclosure relates to trolling motors for watercrafts.

BACKGROUND

U.S. Pat. No. 6,160,764 discloses an electric trolling motor for propelling a boat comprising an electric propulsion motor having a substantially cylindrical motor housing and an electric trolling motor end cap for mounting and protecting a transducer therein, the end cap comprising a body portion having a recess integrally formed therein for receiving a transducer in the recess and a transducer removably mounted in the recess, a bore formed in the end cap creating a passageway extending from the exterior of the end cap to the interior of the recess, and a releasable air pressure seal for obturating the passageway and retaining the transducer in the recess when the passageway is obturated, and releasing the air pressure seal when the passageway is opened; also, a novel end cap for electric trolling motors.

U.S. Pat. No. 6,652,331, which is incorporated herein by reference, discloses a trolling motor having an integral sonar transducer including: a submerged motor housing; an electric motor housed in the housing; a sonar transducer housed in the housing; a motor controller having a pulse width modulated output and a shielded electrical cable connecting the sonar transducer to a sonar device. Noise from all sources (i.e., electrical noise from ground loops, radio frequency interference, and magnetic interference) is suppressed in the output signal of the transducer through a number of techniques. The electrical cable includes an outer shield connected to the chassis ground of the trolling motor; an inner shield connected to the circuit ground of the sonar device; and a pair of signal carrying conductors comprising a twisted pair. In addition, the resonant frequency of the transducer is selected such that it is not a harmonic of the operating frequency of the pulse width modulated output of the motor controller.

U.S. Pat. No. 6,661,742 discloses a trolling motor system including a lower propulsion unit and a transducer assembly. The lower propulsion unit has an external cavity extending into the lower propulsion unit. The transducer assembly includes a sonar transducer and a mount coupled to the sonar transducer. The mount releasably secures the sonar transducer within the cavity. In one exemplary embodiment, the mount includes at least one fastener releasably coupling the mount to the lower propulsion unit. In one exemplary embodiment, the mount releasably secures the sonar transducer within the lower propulsion unit proximate a rear end of the lower propulsion unit.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a trolling motor assembly comprises a main housing holding an electric motor. A propeller is attached to a propeller shaft that is driven by the electric motor and projects from a rear end of the main housing. A steering shaft is configured to couple the main housing to a watercraft. A nosecone is coupled to the main housing at the front end of the main housing. The nosecone is removable from the front end of the main housing. The main housing is watertight when the nosecone is removed therefrom.

According to another example of the present disclosure, an assembly for a trolling motor includes a nosecone having a hydrodynamic front end and an open rear end. An adapter plate has a front side sized and shaped for coupling with the rear end of the nosecone and a rear side sized and shaped for coupling with a front end of a main housing of the trolling motor. An electrical device is located in the nosecone. A first electrical connector is located in the nosecone and coupled to the electrical device. An aperture in the adapter plate allows an electrical cable to extend from the main housing, through the adapter plate, and into the nosecone. A second electrical connector is attached at an end of the cable and is configured to electrically connect with the first electrical connector inside the nosecone. The nosecone is removable from the front side of the adapter plate, and the adapter plate is removable from the front end of the main housing.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
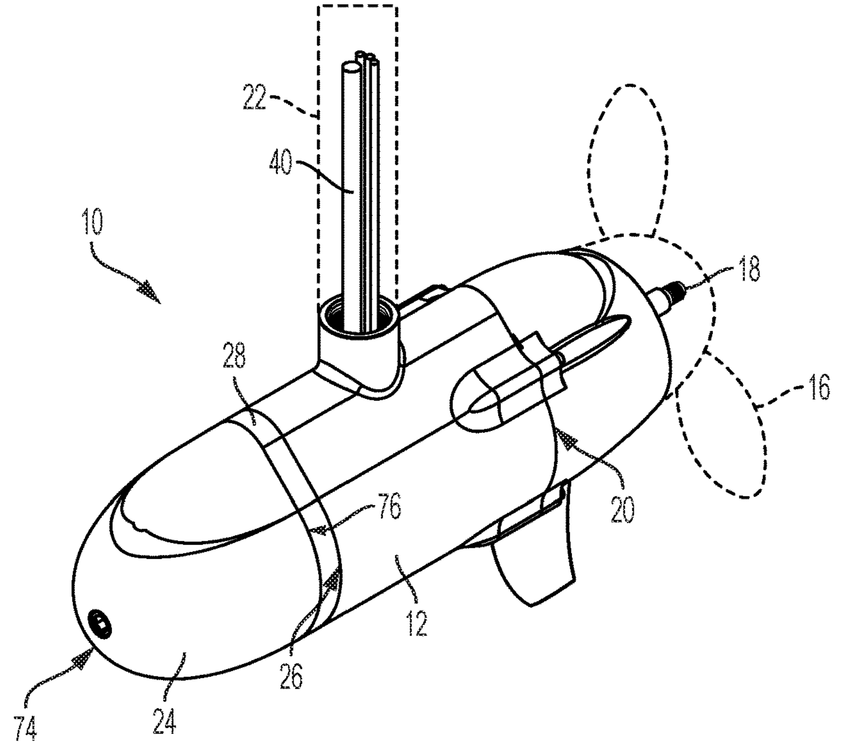
FIG. 1 illustrates an example of a trolling motor.
Figure 3:
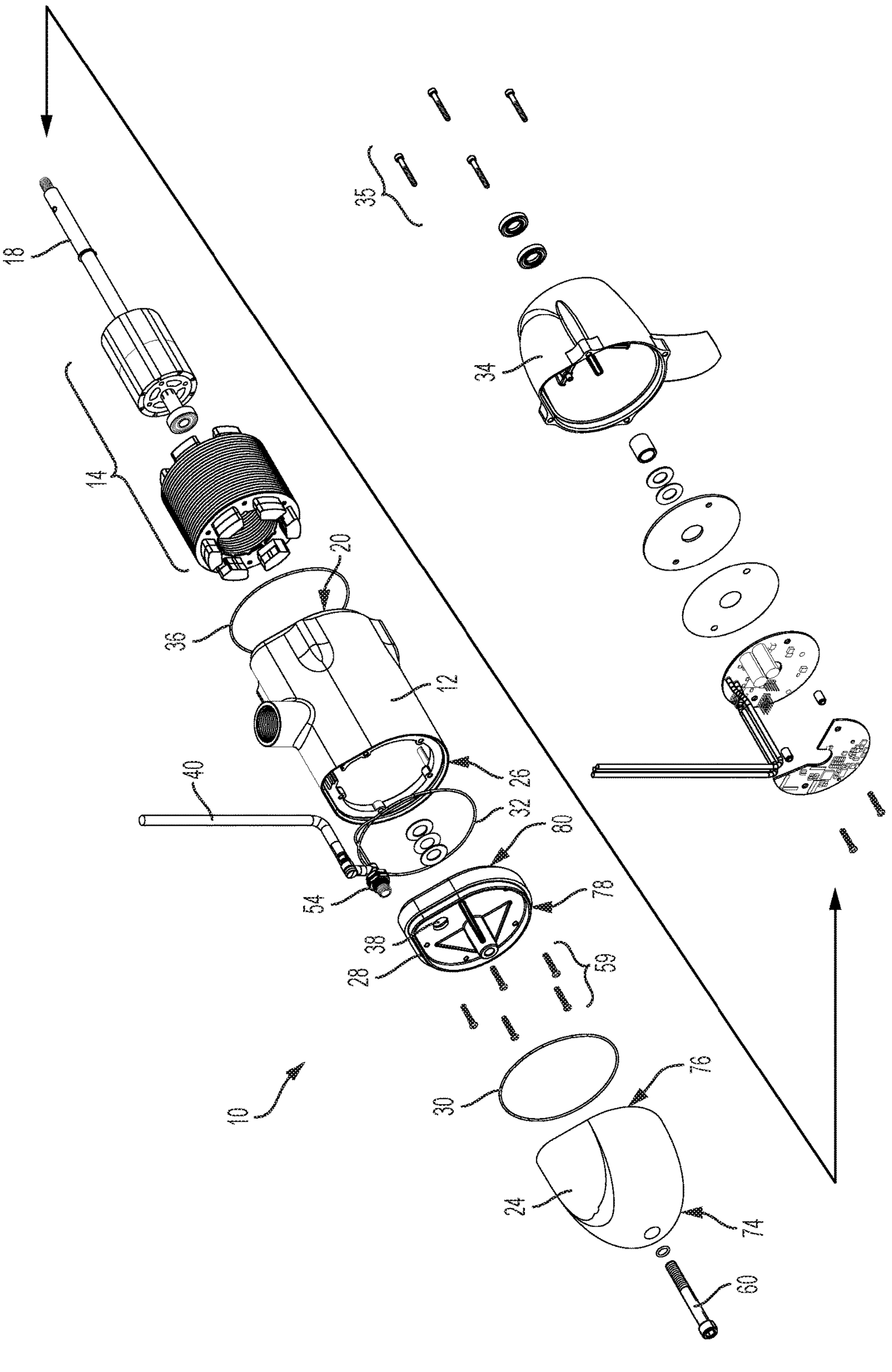
FIG. 3 is an exploded view of the trolling motor of FIG. 1.

FIG. 1 illustrates a trolling motor assembly 10 for propelling a watercraft through a body of water. As is known, the trolling motor assembly 10 can be coupled to a bow, stern, or other part of a watercraft by way of a mounting bracket or similar arrangement, and activated to provide thrust to propel the watercraft through the water. Referring also to FIG. 3, the trolling motor assembly 10 includes a main housing 12 holding an electric motor 14. The trolling motor assembly 10 also includes a propeller 16 attached to a propeller shaft 18 that is driven by the electric motor 14 and projects from a rear end 20 of the main housing 12. Such connection can be made by way of a splined connection with a hub of the propeller 16, as is known to those having ordinary skill in the art.

The trolling motor assembly 10 also includes a steering shaft 22 configured to couple the main housing 12 to a watercraft (not shown). The steering shaft 22 can be rotated by steering cables or a steering motor in torque-transmitting connection with the steering shaft 22, proximate, for example, the bracket that attaches the steering shaft 22 to the watercraft. Mechanical and electromechanical systems and methods for rotating the steering shaft 22 in order to change the direction of thrust of the propeller 16 are known to those having ordinary skill in the art, and therefore will not be described more fully herein.

A nosecone 24 is coupled to the main housing 12 at a front end 26 of the main housing 12. According to the present disclosure, the nosecone 24 is removable from the front end 26 of the main housing 12. Additionally, as will be described further herein below, the main housing 12 is watertight when the nosecone 24 is removed therefrom.

A front endcap 28 is sandwiched between the front end 26 of the main housing 12 and the nosecone 24. A gasket 30 may be included between the nosecone 24 and the front endcap 28, and a gasket 32 may be included between the front endcap 28 and the front end 26 of the main housing 12. The front endcap 28 may be attached to the main housing 12 by way of threaded fasteners, such as screws 59. A rear endcap 34 is attached to the rear end 20 of the main housing 12, such as by way of screws 35, and a gasket 36 may be provided between the rear end 20 and the rear endcap 34. Note that the hub of the propeller 16 is in turn attached at the opposite end of the rear endcap 34. The front and rear endcaps 28, 34 ensure that the respective front and rear ends 26, 20 of the main housing 12 are watertight. Such watertightness is provided in part by inclusion of the gaskets 30, 32, 36.

An electrical cable 40 is provided, which runs from a power source aboard the watercraft, through the steering shaft 22, and into the main housing 12. Although the front endcap 28 includes an aperture 38 for passage of the electrical cable 40 from the main housing 12 to the nosecone 24, an interface between the electrical cable 40 and the front endcap 28 is watertight. Thus, at least with respect to the front end 26, the main housing 12 is watertight due to provision of the front endcap 28, even when the nosecone 24 is not connected to the front endcap 28. Further details of the aperture 38 and the passage of the electrical cable 40 therethrough will be described herein below.

Figure 2:
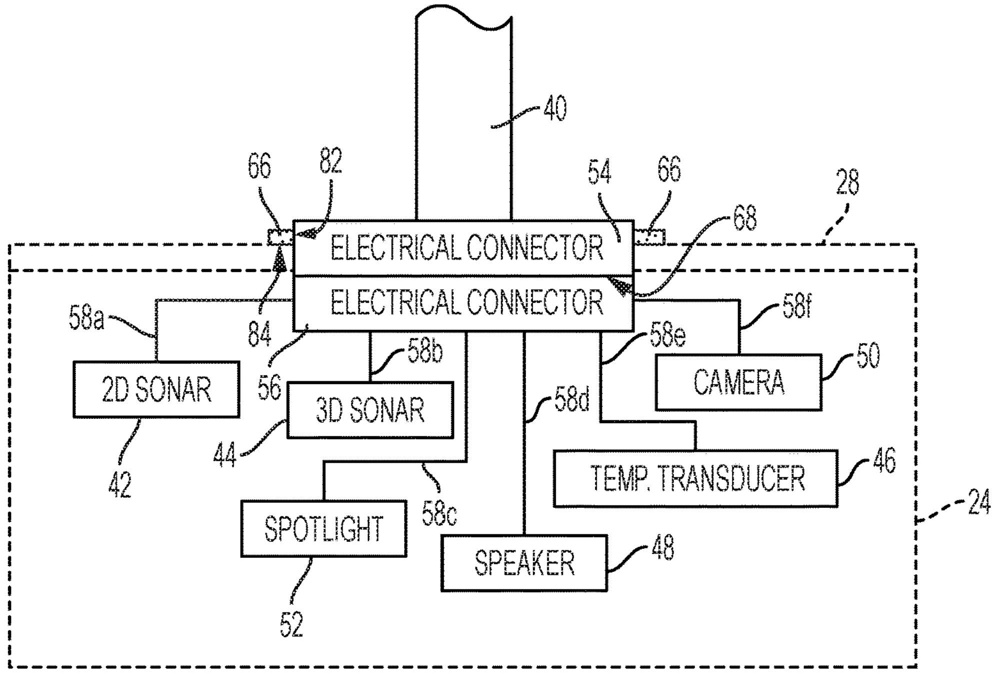
FIG. 2 illustrates a schematic of a nosecone of the trolling motor.

Referring to FIG. 2, the nosecone 24 is configured to receive at least one of the following devices therein: a sonar transducer, which may include a two-dimensional sonar transducer 42 and/or a three-dimensional sonar transducer 44; a temperature transducer 46; an underwater speaker 48; an underwater camera 50; and/or an underwater spotlight 52. Referring to both FIGS. 2 and 3, the trolling motor assembly 10 may further include an electrical connector 54 attached at an end of the electrical cable 40. The electrical connector 54 is configured to be coupled to at least one of the above-noted devices. This is accomplished by way of another electrical connector 56 attached to another electrical cable, such as one or more of cables 58*a*-58*f*, which are in turn connected to the at least one of the devices 42, 44, 46, 48, 50, 52. Note that if several cables 58*a*-58*f* are provided to several different devices, the electrical connector 56 may be provided with ports for connecting to each individual electrical cable 58*a*-58*f*. Note that one or more of the electrical cables 58*a*-58*f* may be a single, combined electrical cable, depending on the location of the devices 42, 44, 46, 48, 50, 52 in the nosecone 24. In another example, only one additional electrical cable 58 may be provided, and only one or two devices may be provided in the nosecone 24. The electrical connector 54 and the electrical connector 56 are configured to electrically connect with one another. Such connection may be made by way of male and female pin and socket connections. In one example, the electrical connector 54 can be an M12-MM panel/male or panel/female 9-pin connector, and the electrical connector 56 can be a mating M12-MA or M12-MP cable/female or cable/male 9-pin connector, both provided by Outdoor Solutions Electronics, Co., LTD of New Taipei City, Taiwan. One or both of the electrical cable 40 and the electrical cable 58 may be a multi-conductor cable configured to be electrically connected to at least two of the devices 42, 44, 46, 48, 50, 52 located in the nosecone 24. The electrical cables 40, 58 and electrical connectors 54, 56 are NMEA-compliant. Not only do the electrical cables 40 and 58*a*-58*e* convey power from a source on the watercraft to the devices, 42, 44, 46, 48, 50, 52, the electrical cables 40 and 58*a*-58*e* also convey electrical signals from the devices 42, 44, 46, 48, 50, 52 back to display screens, gauges, and the like aboard the watercraft.

Figure 4:
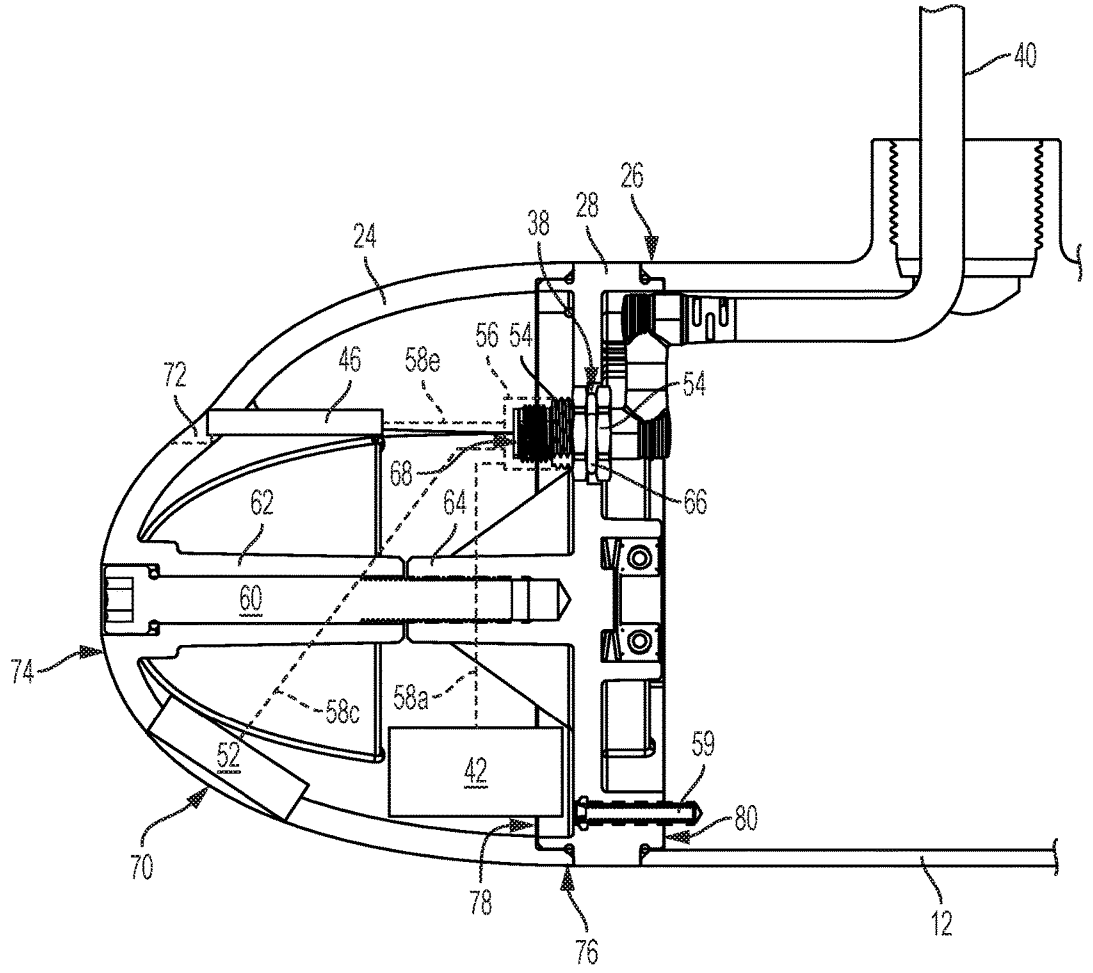
FIG. 4 is a detailed, cutaway view of the nosecone of the trolling motor.

Now turning to FIG. 4, a more detailed view of the nosecone 24, the electrical cable 40, and the front endcap 28 will be described. FIG. 4 illustrates how the front endcap 28 may be coupled to the front end 26 of the main housing 12 by way of screws, one of which is shown at 59 in FIG. 4, and the remainder of which are shown in FIG. 3. The nosecone 24 is in turn attached to the front endcap 28 by way of a single screw 60 extending axially through a cylindrical projection 62 within the nosecone 24 and through a cylindrical projection 64 extending from the front endcap 28. Other attachment mechanisms may be used, as will be described further herein below.

Referring to FIGS. 2 and 4, a watertight interface is provided between the front endcap 28 and the electrical cable 40 by way of an elastomeric gasket 66 that has an inner surface 82 that fits snugly around an outer circumference of the electrical cable 40 and an outer surface (here, front end surface 84) that fits snugly against the front endcap 28 around the aperture 38. In the example shown herein, at least a terminal end 68 of the electrical connector 54 is located in the nosecone 24 when the nosecone 24 is attached to the front endcap 28. Thus, the inner surface 82 of the gasket 66 may in fact fit snugly around an outer surface of the electrical connector 54.

Returning to FIG. 4, the sonar transducer, such as 2D sonar transducer 42, is shown located in the nosecone 24 near a bottom surface thereof. This provides the 2D sonar transducer 42 with an unrestricted pathway for sonar transmissions toward the bottom surface of the waterway. The underwater spotlight 52 may be provided near a lower, front end of the nosecone 24. An outer surface 70 of the nosecone 24 that is adjacent to the spotlight 52 may be translucent or transparent, such that light from the spotlight 52 may shine through and illuminate the bed of the waterway. The temperature transducer 46 may be provided near an upper surface of the nosecone 24, and may be in communication with water surrounding the nosecone 24 by way of an aperture 72 in the outer surface of the nosecone 24. Schematic connections of each device 42, 46, 52 are shown by way of dashed lines to electrical connector 56, it being understood that the dashed lines represent cables 58*a*, 58*e*, 58*c*, respectively.

Thus, referring to FIGS. 1-4, the present disclosure illustrates an assembly 10 for a trolling motor including a nosecone 24 having a hydrodynamic front end 74 and an open rear end 76. The front endcap 28 serves as an adapter plate having a front side 78 sized and shaped for coupling with the rear end 76 of the nosecone 24 and a rear side 80 sized and shaped for coupling with the front end 26 of the main housing 12 of the trolling motor. An electrical device, such as 2D sonar transducer 42, 3D sonar transducer 44, temperature transducer 46, speaker 48, camera 50, or spotlight 52 is located in the nosecone 24. An electrical connector 56 is located in the nosecone 24 and is coupled to the electrical device 42-52. An aperture 38 in the adapter plate 28 allows an electrical cable 40 to extend from the main housing 12, through the adapter plate 28, and into the nosecone 24. An electrical connector 54 is attached at an end of the electrical cable 40 and configured to electrically connect with the electrical connector 56 inside the nosecone 24. As noted, the nosecone 24 is removable from the front side 78 of the adapter plate 28, and the adapter plate 28 is removable from the front end 26 of the main housing 12. The adapter plate 28 is connected to the main housing 12 by way of threaded fasteners, such as by way of screws 59.

Thus far, examples of the trolling motor assembly 10 have been shown with an endcap or adapter plate 28 provided between the nosecone 24 and the main housing 12. It should be noted that the nosecone 24 could instead be connected directly to the front end 26 of the main housing 12, in which case the front end 26 of the main housing 12 would be solid (closed) other than at the aperture 38 for the electrical cable 40. The examples of attachment mechanisms shown in FIGS. 5-13 herein below do not include the front endcap or adapter plate 28. However, it should be understood that the attachment mechanisms described herein could easily be applied to either the front end 26 of the main housing 12, or to the front side 78 of the front endcap/adapter plate 28. Thus, depiction of the attachment mechanisms as being located on the main housing 12 is not limiting on the scope of the present disclosure.

FIGS. 5-13 illustrate various mechanisms for removably coupling the nosecone 24 to the main housing 12. The mechanisms comprise at least one of the following combinations on the rear end 76 of the nosecone 24 and on the front end 26 of the main housing 12. As noted herein above, each combination could instead be provided on the rear end 76 of the nosecone 24 and the front side 78 of the front endcap/adapter plate 28. Some of the embodiments described below illustrate the electrical cables and electrical connectors connected thereto. It should be understood that even where the electrical cable(s) and/or connector(s) are not illustrated, they are in fact provided for electrical connection of the devices within the nosecone 24 to power located aboard the watercraft. Similarly, although the aperture 38 is not shown in each figure, it too exists in each example for providing passage of the electrical cable 40 into the nosecone 24. Additionally, note that although one part of each attachment mechanism combination is shown on either the nosecone 24 or the main housing 12, the parts of the attachment mechanisms could be reversed, such that the parts are provided on the opposite components than illustrated here.

Figure 5:
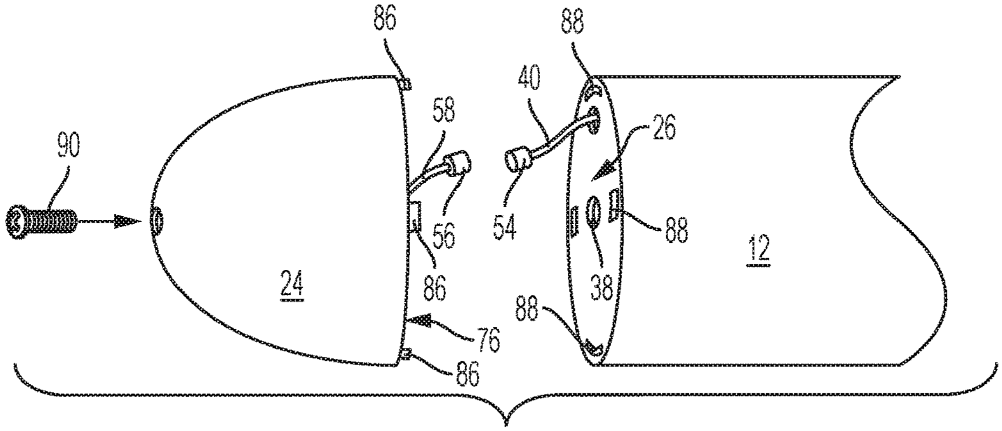
FIGS. 5-8 illustrate examples of attachment mechanisms for connecting the nosecone to the main housing of the trolling motor, wherein the attachment mechanisms include screws.

FIG. 5 illustrates an example in which the attachment mechanism includes keyed teeth 86 at the rear end 76 of the nosecone 24 and corresponding receiving slots 88 at the front end 26 of the main housing 12. After the keyed teeth 86 are fit into the receiving slots 88, a screw 90 is used to attach the nosecone 24 to the main housing 12.

Figure 6:
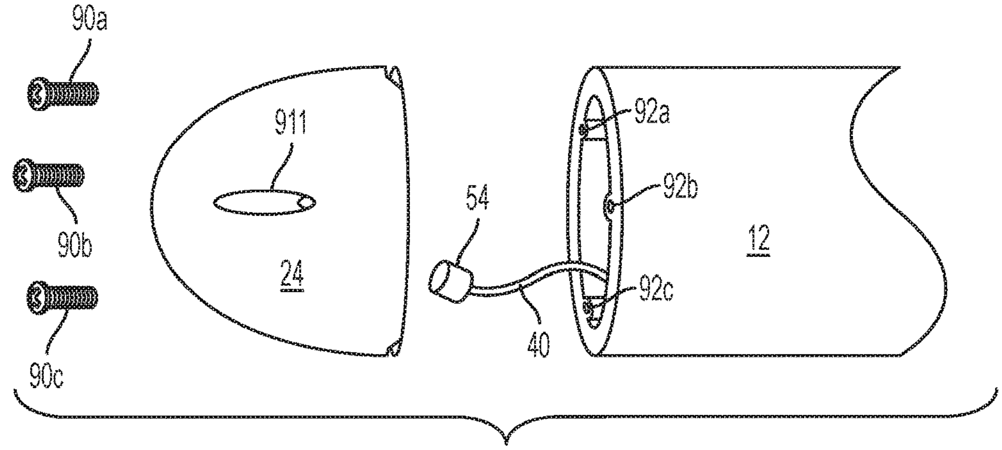
Figure 7:
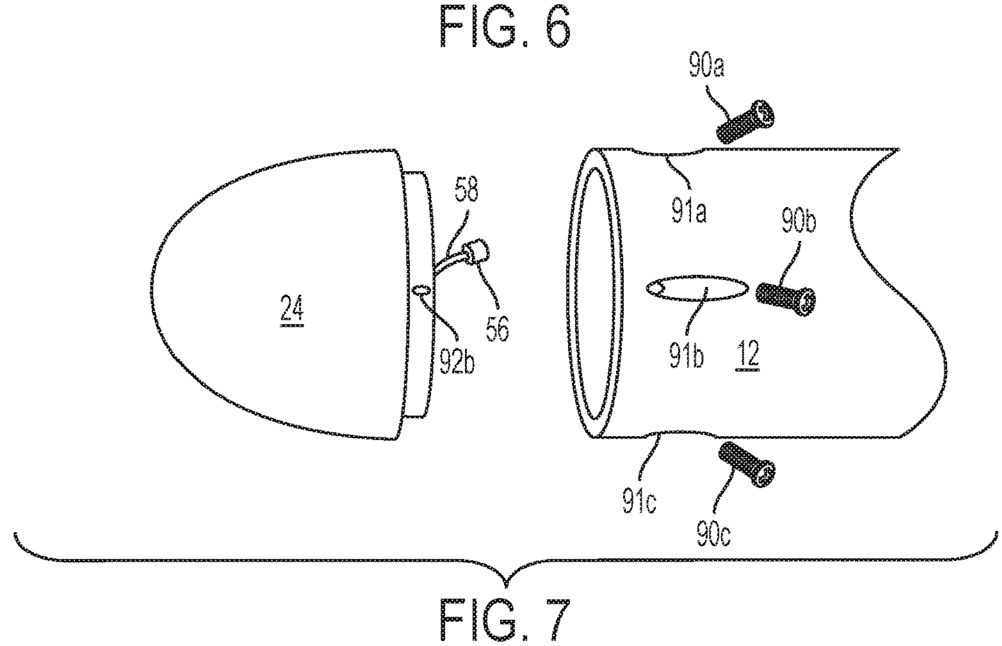

FIGS. 6 and 7 illustrate examples in which the nosecone 24 and the main housing 12 are connected by way of screws 90*a*-90*c* fitted into depressions 91, 91*a*, 91*b*, 91*c*, and then tightened in threaded receiving holes 92*a*-92*c*. Keyed teeth and receiving slots, although not shown herein, could be used in these embodiments as well.

Figure 8:
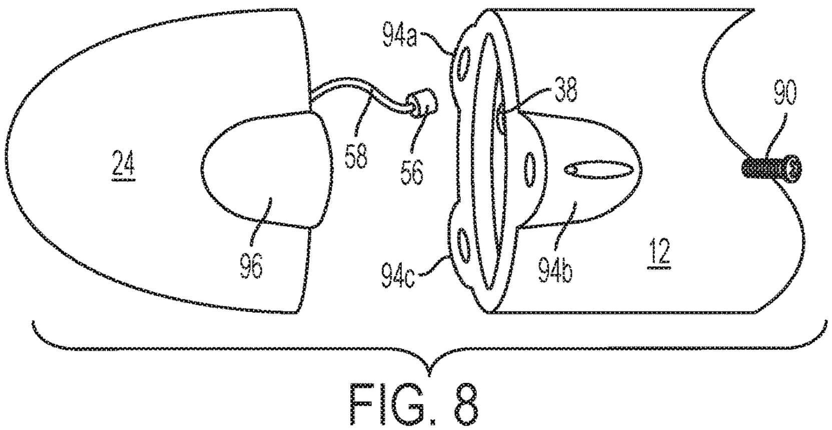

FIG. 8 illustrates an example in which the attachment mechanism includes screws, such as screw 90, and corresponding screw bosses, shown at 94*a*-94*c*. Corresponding screw bosses, one of which is shown at 96, for receiving the screws are located on the opposite portion of the trolling motor assembly, in this example, the nosecone 24.

Figure 9:
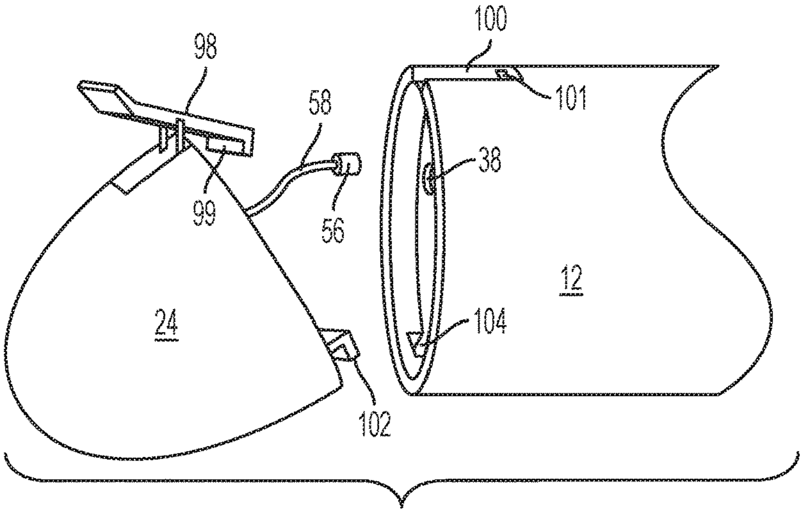
FIGS. 9 and 10 illustrate examples of attachment mechanisms including jar clamps.

FIG. 9 illustrates an example in which the attachment mechanism includes a jar clamp 98 and a corresponding receiving notch 100 with a slot 101 for receiving the hooked end 99 of the jar clamp 98 therein. A keyed tooth 102 and a corresponding receiving slot 104 may be provided for correctly locating the nosecone 24 on the main housing 12 before the jar clamp 98 is used to secure the nosecone 24 to the main housing 12.

Figure 10:
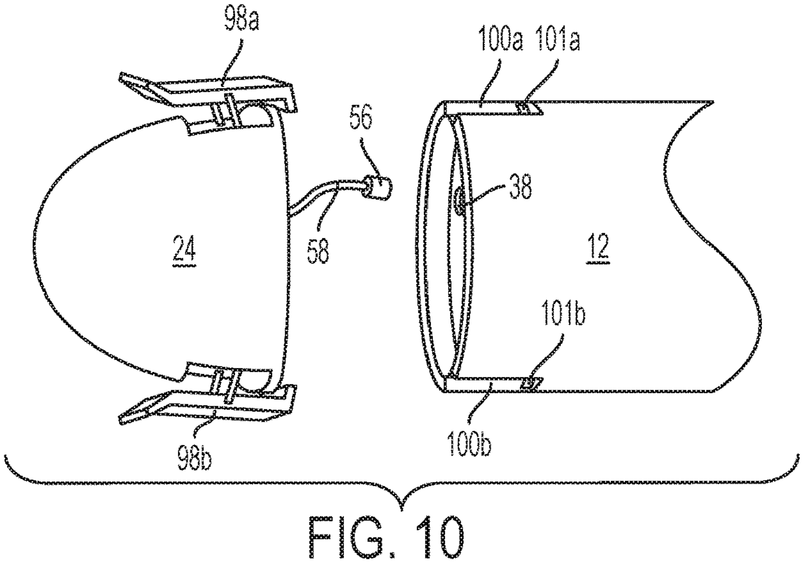

FIG. 10 illustrates an example in which two jar clamps 98*a*, 98*b* and two corresponding receiving notches 100*a*, 100*b* with slots 101*a*, 101*b* are provided on either side of the main housing 12.

Figure 11:
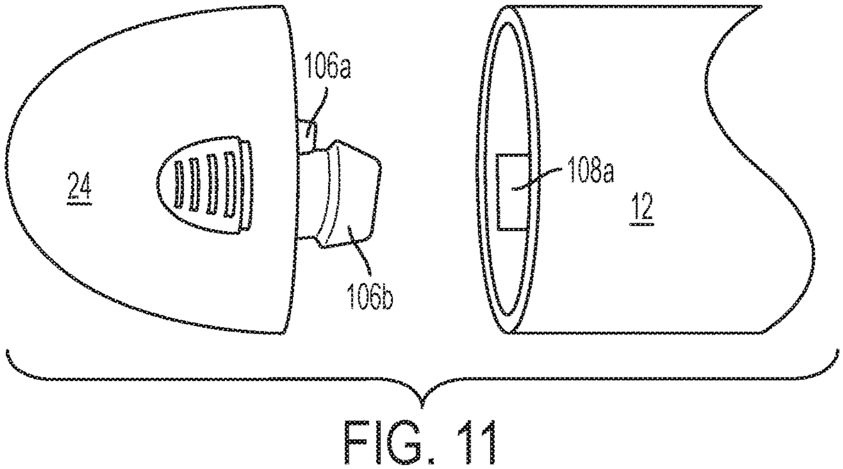
FIG. 11 illustrates an example of an attachment mechanism including a spring loaded clip.

FIG. 11 illustrates an example in which the attachment mechanism includes spring-loaded attachment tabs 106*a*, 106*b* and corresponding tab recesses, one of which is shown at 108*a*. The tab recess for receiving attachment tab 106*b* is not shown, because it is on the inner face of the main housing 12 that cannot be seen from the present perspective.

Figure 12:
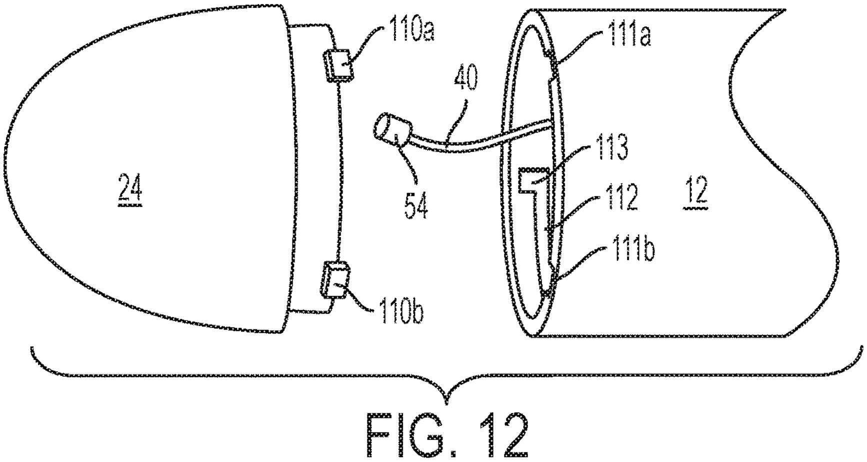
FIG. 12 illustrates an example of an attachment mechanism including locking projections.

FIG. 12 illustrates an example in which the attachment mechanism includes locking projections 110*a*, 110*b* and a corresponding ramped slot 112. The locking projections 110*a*, 110*b*, once inserted in the open ends 111*a*, 111*b* of the ramped slot 112, can be rotated within the ramped slot 112 to lock the nosecone 24 to the main housing 12. The locking projections 110*a*, 110*b* will stop rotation of the nosecone 24 once they reach ends of the ramped slot 112, such as shown at 113.

Figure 13:
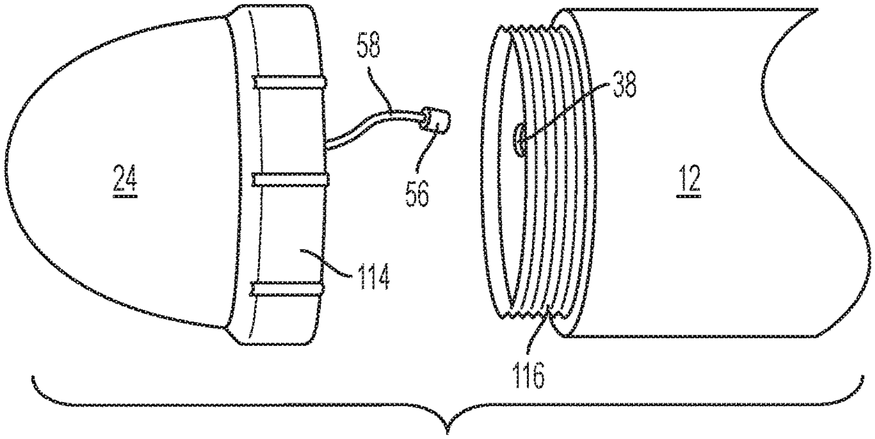
FIG. 13 illustrates an example of an attachment mechanism including an independently rotating threaded collar.

FIG. 13 illustrates an example in which the attachment mechanism includes an independently rotating collar 114 with inner threads (not shown) and corresponding outer threads 116 on the main housing 12. The collar 114 can be rotated with respect to both the nosecone 24 and the threads 116 of the main housing 12 in order to secure the nosecone 24 to the main housing 12.

Various lower units on trolling motors on the market include a nosecone that is not replaceable. If a user wants to have, for example, sonar capabilities, he/she would need to buy a trolling motor with a sonar transducer installed in the nosecone of the lower unit, or would need to mount a sonar transducer on the lower unit of the trolling motor. This latter option negatively affects the performance of the trolling motor by increasing the drag produced by the lower unit. Thus, the present disclosure provides several examples of a replaceable nosecone for a lower unit of a trolling motor. Such a nosecone 24 allows the end user to replace the nosecone 24 on the main housing 12 with a new nosecone 24 that has, for example, sonar capabilities.

The trolling motor assembly 10 described herein also includes a user-friendly way to electrically connect devices aboard the watercraft to the devices located in the nosecone 24. For example, by way of electrical connectors 54, 56 on electrical cables 40, 58, different types of devices in the nosecone 24 can be coupled to power and display screens, gauges, etc. aboard the watercraft. Providing a replaceable nosecone allows the end user to update his or her trolling motor without needing to buy an entirely new trolling motor. For example, as sonar technology advances, nosecones with different types of sonar transducers may be installed on the main housing 12. By providing electrical cables and connectors that are not permanently attached all the way from the watercraft to the device(s) located in the nosecone, the present disclosure allows for connection and disconnection of various devices as the nosecone 24 is replaced, such as when it is upgraded. Because the electrical cables are multi-conductor cables, as new technology emerges, the electrical cable 40 running through the main housing 12 does not need to be replaced to accommodate new or additional devices. Rather, the electrical connector 56 on the cable 58 attached to a particular device can be updated as required.

Because the nosecone 24 is replaceable, the main housing 12 is designed to be completely watertight, even when the nosecone 24 is not connected thereto. Therefore, any electrical cable 40 coming from the main housing 12 is sealed by way of a gasket 66, as described herein above. Additionally, the devices and cables located in the nosecone 24 do not need to be potted in order to provide waterproofing, as the front end of the main housing 12 or the front endcap/adapter plate 28 provides such water proofing for the main housing 12.

Note that although the nosecone 24 has been described with respect to inclusion of a device such as 2D sonar transducer 42, 3D sonar transducer 44, temperature transducer 46, speaker 48, camera 50, or spotlight 52, the nosecone 24 could instead be empty, or could have any other type of transducer known to those having ordinary skill in the art.

In the above description, certain terms have been used for brevity, clarity, and understanding. No unnecessary limitations are to be inferred therefrom beyond the requirement of the prior art because such terms are used for descriptive purposes and are intended to be broadly construed. All embodiments in the present application and claimed below can be combined unless obviously not feasible to one having ordinary skill in the art. The different assemblies described herein may be used alone or in combination with other assemblies. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A trolling motor assembly comprising:
- a main housing holding an electric motor;
- a propeller attached to a propeller shaft that is driven by the electric motor and projects from a rear end of the main housing;
- a steering shaft configured to couple the main housing to a watercraft;
- a nosecone coupled to the main housing at a front end of the main housing;
- a front endcap sandwiched between the front end of the main housing and the nosecone; and
- a rear endcap attached to the rear end of the main housing;
- wherein the nosecone is removable from the front end of the main housing;
- wherein the main housing is watertight when the nosecone is removed therefrom; and
- wherein the front and rear endcaps ensure that the respective front and rear ends of the main housing are watertight.

2. The trolling motor assembly of claim 1, wherein the front endcap includes an aperture for passage of a first electrical cable from the main housing to the nosecone; and
- wherein an interface between the first electrical cable and the front endcap is watertight.

3. The trolling motor assembly of claim 2, further comprising an elastomeric gasket having an inner surface that fits snugly around an outer circumference of the first electrical cable and an outer surface that fits snugly against the front endcap around the aperture.

4. The trolling motor assembly of claim 2, wherein the nosecone is configured to receive at least one of the following devices therein:
- a sonar transducer;
- a temperature transducer;
- an underwater speaker;
- an underwater camera; and
- an underwater spotlight.

5. The trolling motor assembly of claim 4, further comprising a first electrical connector attached at an end of the first electrical cable;
- wherein at least a terminal end of the first electrical connector is located in the nosecone when the nosecone is attached to the front endcap; and
- wherein the first electrical connector is configured to be coupled to the at least one of the devices.

6. The trolling motor assembly of claim 5, further comprising a second electrical connector attached to a second electrical cable that is connected to the at least one of the devices, wherein the first electrical connector and the second electrical connector are configured to electrically connect with one another.

7. The trolling motor assembly of claim 5, wherein the first electrical cable is a multi-conductor cable configured to be electrically connected to at least two of the devices.

8. The trolling motor assembly of claim 1, further comprising a mechanism for removably coupling the nosecone to the main housing, the mechanism comprising at least one of the following combinations on a rear end of the nosecone and a front side of the front endcap:
- keyed teeth and corresponding receiving slots;
- screws and corresponding screw bosses;
- a jar clamp and a corresponding receiving notch;
- spring-loaded attachment tabs and corresponding tab recesses;
- locking projections and a corresponding ramped slot; and
- an independently rotating collar with inner threads and corresponding outer threads.

9. A trolling motor assembly comprising:
- a main housing holding an electric motor;
- a propeller attached to a propeller shaft that is driven by the electric motor and projects from a rear end of the main housing;
- a steering shaft configured to couple the main housing to a watercraft; and
- a nosecone coupled to the main housing at a front end of the main housing;
- wherein the nosecone is removable from the front end of the main housing; and
- wherein the main housing is watertight when the nosecone is removed therefrom; and
- further comprising a mechanism for removably coupling the nosecone to the main housing, the mechanism comprising at least one of the following combinations on a rear end of the nosecone and the front end of the main housing:
- keyed teeth and corresponding receiving slots;

screws and corresponding screw bosses;

a jar clamp and a corresponding receiving notch;

spring-loaded attachment tabs and corresponding tab recesses;

locking projections and a corresponding ramped slot; and an independently rotating collar with inner threads and corresponding outer threads.

10. The trolling motor assembly of claim 9, wherein the nosecone is configured to receive at least one of the following devices therein:

a sonar transducer;

a temperature transducer;

an underwater speaker;

an underwater camera; and an underwater spotlight.

11. An assembly for a trolling motor, the assembly comprising:

a nosecone having a hydrodynamic front end and an open rear end;

an adapter plate having a front side sized and shaped for coupling with the rear end of the nosecone and a rear side sized and shaped for coupling with a front end of a main housing of the trolling motor;

an electrical device located in the nosecone;

a first electrical connector located in the nosecone and coupled to the electrical device;

an aperture in the adapter plate that allows an electrical cable to extend from the main housing, through the adapter plate, and into the nosecone; and a second electrical connector attached at an end of the electrical cable and configured to electrically connect with the first electrical connector inside the nosecone;

wherein the nosecone is removable from the front side of the adapter plate, and the adapter plate is removable from the front end of the main housing.

12. The assembly of claim 11, wherein the main housing is watertight when the adapter plate is attached thereto and the electrical cable is inserted in the aperture.

13. The assembly of claim 12, further comprising a gasket having an inner surface that fits snugly around an outer surface of the electrical cable and an outer surface that fits snugly against the adapter plate around the aperture.

14. The assembly of claim 12, wherein the second electrical connector extends through the aperture such that a terminal end of the second electrical connector is located inside the nosecone when the nosecone is connected to the adapter plate.

15. The assembly of claim 14, further comprising a gasket having an inner surface that fits snugly around an outer surface of the second electrical connector and an outer surface that fits snugly against the adapter plate around the aperture.

16. The assembly of claim 11, wherein the electrical device comprises at least one of:

a sonar transducer;

a temperature transducer; and an underwater spotlight.

17. The assembly of claim 11, wherein the electrical device comprises at least one of:

an underwater speaker; and an underwater camera.

18. The assembly of claim 11, further comprising a mechanism for removably coupling the nosecone to the adapter plate, the mechanism comprising at least one of the following combinations on the rear end of the nosecone and the front side of the adapter plate:

screws and corresponding screw bosses; and an independently rotating collar with inner threads and corresponding outer threads.

19. The assembly of claim 11, further comprising a mechanism for removably coupling the nosecone to the adapter plate, the mechanism comprising at least one of the following combinations on the rear end of the nosecone and the front side of the adapter plate:

keyed teeth and corresponding receiving slots;

a jar clamp and a corresponding receiving notch;

spring-loaded attachment tabs and corresponding tab recesses; and locking projections and a corresponding ramped slot.

20. The assembly of claim 11, wherein the adapter plate is connected to the main housing by way of threaded fasteners.

* * * * *